C. G. NAYLOR & R. R. ROBERTSON.
PIPE RIVETING MACHINE.
APPLICATION FILED MAY 13, 1911.
1,081,691.
Patented Dec. 16, 1913.
3 SHEETS—SHEET 1.
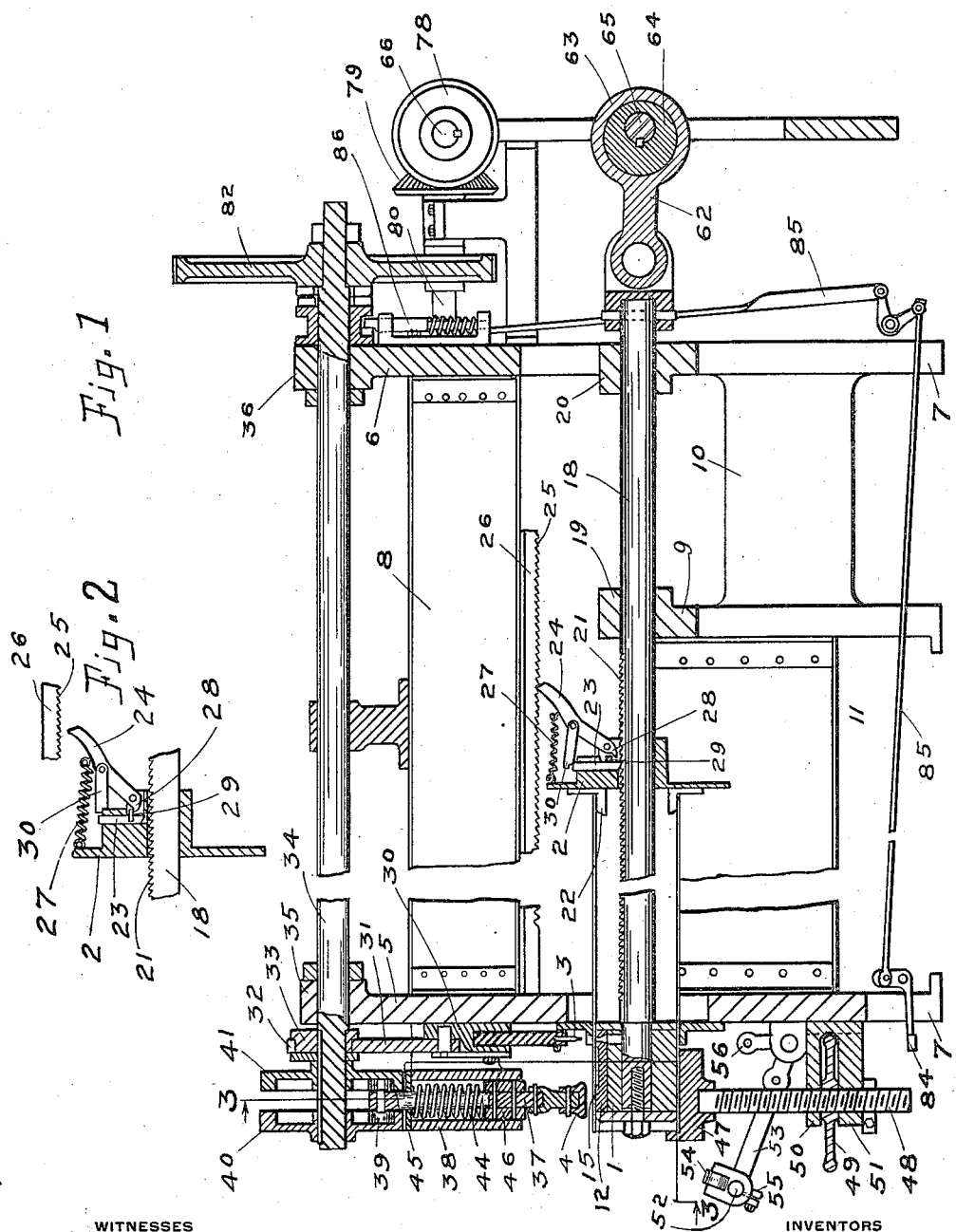
WITNESSES
INVENTORS
ROBERT R. ROBERTSON
CARL G. NAYLOR

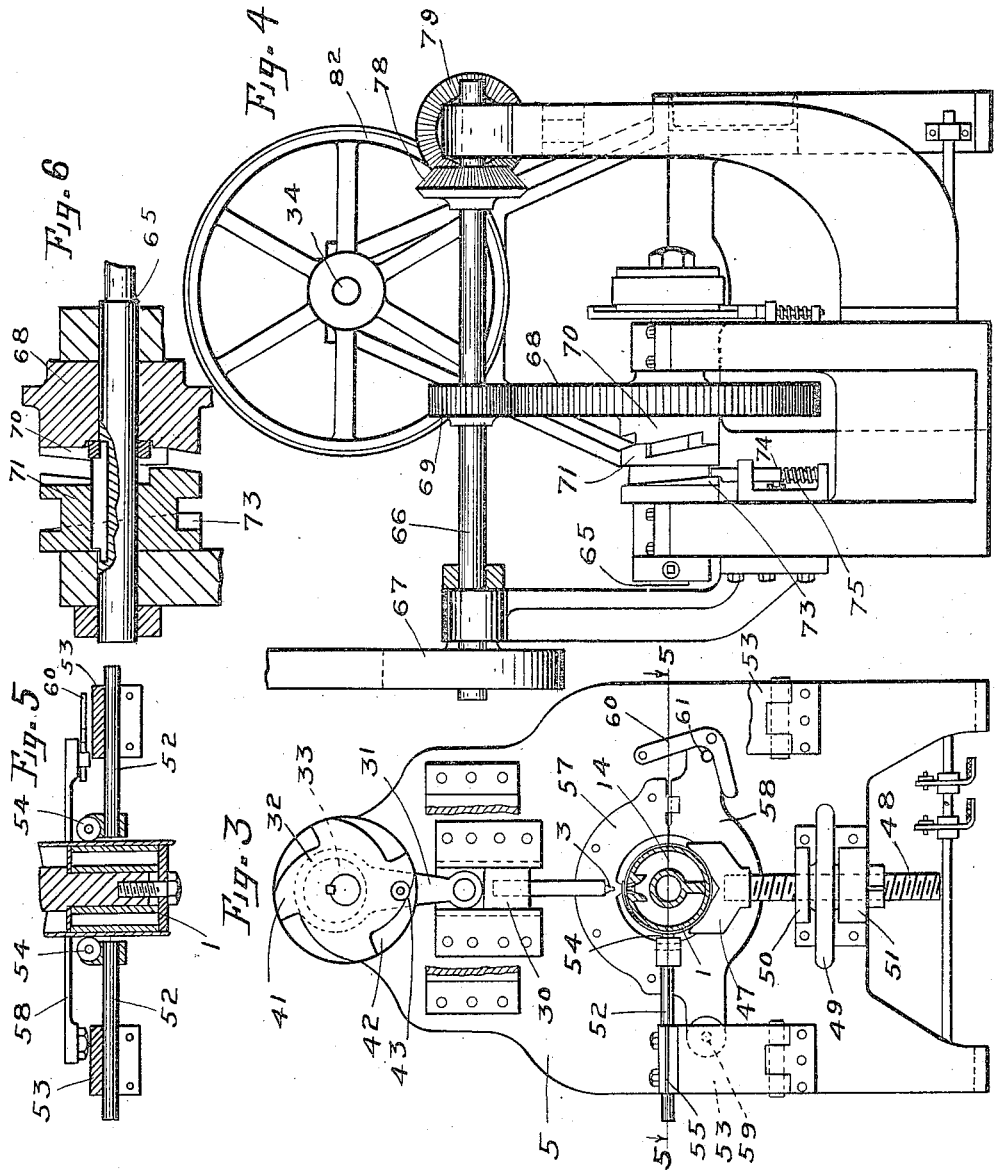

C. G. NAYLOR & R. R. ROBERTSON.
PIPE RIVETING MACHINE.
APPLICATION FILED MAY 13, 1911.
1,081,691.
Patented Dec. 16, 1913.
3 SHEETS—SHEET 3.
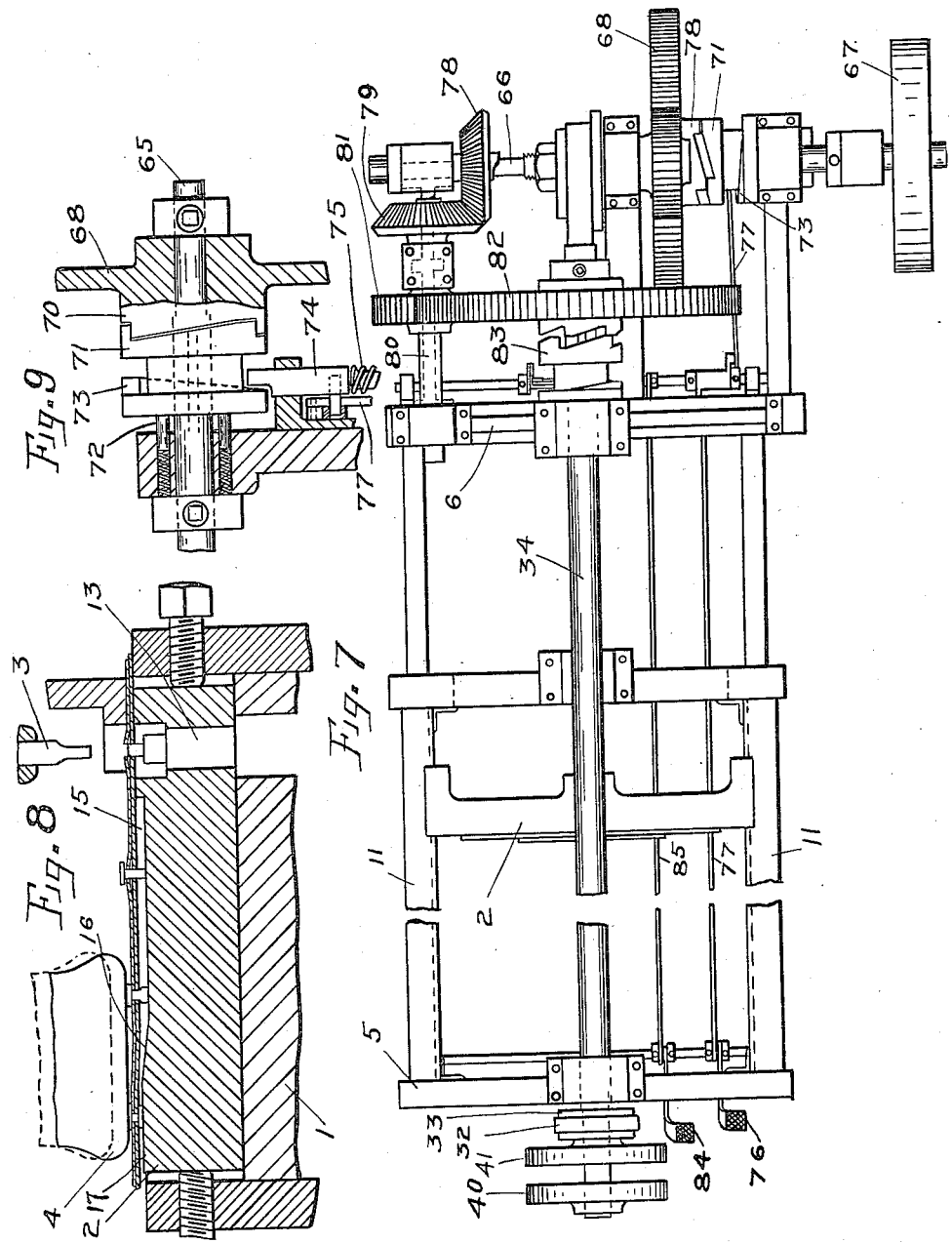
INVENTORS
ROBERT R. ROBERTSON
CARL G. NAYLOR

UNITED STATES PATENT OFFICE.

CARL G. NAYLOR AND ROBERT R. ROBERTSON, OF CHICAGO, ILLINOIS.

PIPE-RIVETING MACHINE.

1,081,691. Specification of Letters Patent. Patented Dec. 16, 1913.

Application filed May 13, 1911. Serial No. 627,055.

*To all whom it may concern:*

Be it known that we, CARL G. NAYLOR and ROBERT R. ROBERTSON, citizens of the United States, residing at Chicago, in the county of Cook and State of Illinois, have invented new and useful Improvements in Pipe-Riveting Machines, of which the following is a full, clear, concise, and exact description, reference being had to the accompanying drawing, forming a part of this specification.

Our invention relates to improvements in machines for riveting seams of pipes.

One of the objects of our invention is to provide a machine which will handle great lengths of pipe and which will rapidly and precisely rivet the seams of the pipe.

For the purpose of disclosing our invention we have illustrated one form thereof in the accompanying drawings.

In said drawings: Figure 1 is a longitudinal sectional view of a machine embodying our invention; Fig. 2 is a detail view of the carriage advancing dog; Fig. 3 is a transverse sectional view on the line 3—3 of Fig. 1; Fig. 4 is a rear end elevation; Fig. 5 is a sectional view on the line 5—5 of Fig. 3; Fig. 6 is a sectional detail of the clutching mechanism; Fig. 7 is a top plan view of the machine; Fig. 8 is a detail sectional view of the riveting anvil; and Fig. 9 is a detail view of the clutch tripping mechanism.

In order that a better understanding of our machine may be had, we will describe first certain main parts of the machine and the sequence of operation thereof.

The machine illustrated in the drawings comprises an anvil or pipe head supporting device 1, a pipe carriage 2, which is adapted to support the rear end of the pipe and move the pipe forward, a punch 3 and riveting hammer 4. In operation, the pipe is placed around the head 1 which is of such size as to snugly fit the pipe and is fed forward step by step by the carriage 2. During the interval of each step the punch 3 and the riveting hammer 4 operate respectively to punch a hole in the pipe and to head a rivet which is inserted in the hole punched. When the pipe is first started, the punch 3 makes a hole; during the next forward step, the punch 3 makes a second hole and a rivet is inserted in the first hole with its already formed head on top. On the next forward step the punch 3 makes a third hole and the rivet which has been inserted in the second hole is struck by the riveting hammer a slight blow to give the rivet a slight head. When the pipe is placed around the head, the meeting edges thereof have a tendency to separate, so that unless some means is provided for drawing the edges together or forcing the edges together before the head of the rivet is formed, a part of the metal of the rivet will spread between the meeting edges during the heading operation. By the construction of my device this is avoided. After the hole is punched the rivet is inserted with its previously formed head on top, and as the hammer descends the blow first tends to force the edges of the pipe together, while the end of the rivet after this forcing of the edges together will be slightly headed to hold them in their new position. On the next step the punch will make a fourth hole, a rivet may be inserted in the third hole, the hammer will slightly head the rivet in the second hole and will complete the head of the rivet in the first hole. After the mechanism has been once started this complete cycle will take place on each step forward of the pipe.

The mechanism for operating the various devices above enumerated and the devices themselves are all mounted on a suitable frame-work. This frame-work is built up preferably of metal and has a front member 5 and a rear member or end 6, each provided with suitable legs, as at 7, adapted to rest on the ground or other support. The two end members are connected together by an upper center beam 8 which may take the form of an angle iron and is bolted to the respective end members. The end member 6 has integrally connected therewith an intermediate supporting device 9 which is connected thereto by a web 10 and this intermediate supporting device is connected to the front end member by suitable beams 11, which are respectively bolted to the end member 5 and the intermediate member 9. The frame is thus rigidly constructed and is sufficiently heavy to carry all of the operating parts.

The anvil or head comprises a cored cylindrical head which is provided on its upper side with an anvil member 12 secured to the head in any desired manner. The rear end of the anvil member is provided with a punch opening 13 through which the punch is adapted to pass and the portion of the metal of the head beneath this opening is cored out, as at 14, to permit the punchings to drop down and out of the head. Formed in the anvil in front of this punch opening is a longitudinal slot 15, the depth of which is great enough to permit a rivet to be inserted through the hole punched in the pipe and project below the inner side of the pipe. Near the end of the anvil the bottom of this slot slopes upwardly, as shown at 16, until the slot ends on the flattened anvil portion 17. The purpose of this formation of the slot will appear more fully hereinafter.

The head 1 is removably mounted on the end of a reciprocating rod 18 which is supported intermediate of its ends in a bearing 19 formed on the member 9 and at its rear end a bearing 20 formed in the end piece 6. This rod is provided with ratchet teeth 21 adapted to coöperate with mechanism on the pipe carriage 2 to advance the carriage step by step as the rod is reciprocated. The pipe carriage 2 extends transversely of the machine and slides on the two side beams 11. The central portion of the carriage is provided with an opening through which the rod 18 is adapted to extend. This carriage is provided on its front face with an annular flange 22 over which the rear end of the pipe is adapted to fit and be supported thereby. At the rear of the carriage a reciprocating dog 23 is mounted which is adapted to engage the ratchet teeth 21 on the rod to advance the carriage with the mandrel as it moves forward. This dog, it will be noted, however, rides up over the ratchet teeth as the rod moves rearwardly, so that the carriage will not be carried back on the rearward movement of the rod. To prevent the backward movement of the carriage we provide a dog 24 which is adapted to engage ratchet teeth 25 on the ratchet bar 26 secured to the under side of the center beam 8. This dog is pivoted at its lower end to the carriage 2 and will ride over the ratchet teeth 25 during the forward movement of the carriage but will engage the ratchet teeth to prevent a rearward movement of the carriage. A coiled spring 27 holds the dog 24 in engagement with the ratchet teeth 25. To hold the dogs 23 and 24 out of engagement with their respective ratchet teeth and permit the pipe carriage to move freely when a pipe section is being inserted in the machine, the lower end of the dog 24 is provided with a shoulder 28 adapted to engage under a pin 29 on the dog 23 and raise the dog when the end of the dog 24 is lowered;—and the dog 24 is provided with a stop lug 30 adapted to engage the pipe carriage to hold the end of the dog 24 lowered against the action of the coiled spring 27.

The punch 3 is supported in a reciprocating head 30. This reciprocating head 30 is connected by a link 31 with an eccentric strap 32 fitting over the eccentric 33 mounted on a shaft 34. The shaft is suitably supported in journals 35 and 36 formed in the end members 5 and 6, respectively.

The riveting hammer 4 is mounted on the end of a reciprocating rod 37 operating in a guide 38 extending from the front end member 5. The upper end of the rod 37 is provided with rollers 39 which are adapted to be engaged by cams on cam wheels 40 and 41 mounted on the shaft 34. The cam wheels 40 and 41 are provided with corresponding inwardly extending cams, and each wheel has four cam surfaces. The cam wheels 40 and 41 are so arranged on the shaft 34 that when the clutch controlling the rotation of the shaft is disengaged, the cam 42 will be caused to stop with a portion thereof beneath the roller, substantially as illustrated in Fig. 3, bringing the seat 43 beneath the roller so that the cam will hold the hammer slightly raised off the anvil. A suitable seat 43 is formed in the cam 42 to prevent the hammer spring from rotating the shaft 34 backward. The hammer is depressed or moved down as it moves off of the cam surfaces by a coiled spring 44 interposed between the top 45 of the guide 38 and a collar 46 on the rod 37. When the hammer is raised by the cams, the spring is compressed and as soon as the rollers move off the cam members, the hammer is driven downwardly with considerable force to form a head on the rivet.

As the front end of the rod 18 has no bearing and as the blow not only of the hammer 4 in forming the head of the rivet but of the punch 3 in punching a hole would tend to depress the head 1, we provide a suitable supporting mechanism for the head which may be adjusted to position after the pipe has been placed in position over the head 1. This supporting mechanism comprises a block 47 mounted on a screw 48 which is raised or lowered by a hand nut 49 secured between a pair of bearing surfaces 50 and 51 extending from the front member 5 of the frame. After the pipe has been inserted in position over the head 1 the block 47 may be raised by the hand nut 49 until it is in engagement with the under side of the head 1, and the head 1 held up to the proper position to be beneath the hammer and punch.

The head is guided so that the hole 13 will always be in correct alinement with the punch by a pair of inwardly extending arms 52 mounted on supports 53 hinged to the front member 5. These arms are provided with rollers 54 adapted to engage the sides of the head, the pipe intervening, and correctly aline the head in its reciprocating movement. The arms are adjustably held in position on the supports by clamping members 55 and are swung out of position to permit the insertion and removal of a pipe by swinging the supports 53 outwardly upon their hinges. An arm 56 on the supports 53, having an opening in which a locking pin is inserted, holds the supports in their raised position.

The pipe is held in shape around the head 1 by a pair of clamping jaws 57 and 58. The jaw 57 is stationarily mounted on the front member 5 while the jaw 58 is pivotally mounted at 59 and swings downwardly to permit the insertion of the pipe. A latch 60 adapted to engage over the pin 61 on the jaw 58 holds the jaw closed.

The rod 18 at its rear end is connected by a link 62 and eccentric strap 63 with an eccentric 64 mounted on the shaft 65, whereby a reciprocating movement is given to the rod 18 as the shaft 65 is rotated. The shaft 65 is driven from a main shaft 66 having a suitable pulley 67 thereon and connected with the shaft 65 by a gear 68 and pinion 69. The gear 68 is loosely mounted on the shaft 65 and is connected thereto by a clutch controlled by the operator. One member 70 of the clutch is formed on the hub of the gear and the other member 71 is keyed to the shaft 65 as shown in Fig. 6. The member 71 is normally pressed into engagement with the member 70 by a plurality of spring pressed pins 72 (see Fig. 9). For disengaging the clutch, the member 71 is provided with a cam 73 which engages a tripping dog 74 mounted on the frame of the machine and as the shaft rotates, this cam riding on the dog moves the clutch member laterally and disconnects the clutch members. The tripping dog is normally held in position to disengage the clutch by a coiled spring 75 and is moved in position to permit the clutch to operate by a foot lever 76 connected thereto by suitable operating rods 77. The shaft 34 is driven from the shaft 66 by a suitable gear train comprising the bevel gears 78 and 79 mounted respectively on the shaft 66 and the stub shaft 80, the pinion 81 mounted on the shaft 80, and the gear 82 mounted on the shaft 34. The gear 82 is loosely mounted on the shaft 34 and is adapted to be connected thereto by a clutch 83 of similar construction as that controlling the gear 68. This clutch is operated from a foot lever 84 connected by suitable operating rods 85 with the tripping dog 86.

In operation, the carriage 22 is run to its rearmost limit by hand. The clamping jaws 57 and 58 are opened and the block 47 is lowered. A pipe is then slipped over the head 1 and rearwardly until its rear end engages the carriage 22. The levers 55 are then adjusted to properly position the pipe beneath the punch, and the jaws 57 and 58 are locked. The operator first trips the punching and riveting mechanism by pressing on the lever 84, permitting this mechanism to operate sufficiently long for the punch to make one hole. He then releases the foot lever 84 and presses upon the foot lever 76, thereby tripping the mechanism for reciprocating the rod 18. The eccentric making one complete turn will move the rod 18 forward one step. The operator then releases his foot from the foot lever 76 and trips the punching and riveting mechanism, by the lever 84. A second punch hole is made and the carriage is again advanced one step. The punching mechanism is again thrown into operation, the operator in the meantime having placed a rivet in the first hole punched, and the riveting hammer and punch mechanism are again started. The descent of the riveting hammer first draws the two edges of the pipe, which have a tendency to separate, together. This is due to the fact that the slot 15 in the anvil is of sufficient depth to permit the rivet to be forced down therein, and unless the surfaces of the edges of the pipe are close together, the end of the rivet will not rest on the bottom of the slot. Therefore, the downward movement of the hammer will flatten the pipe or force together the two surfaces thereof at its edges, and as the slot 15 is of less depth than the length of the rivet, while the two surfaces are thus forced together, will slightly head the rivet to hold the edges of the pipe in this position. At the same time the fourth punch hole is made. The pipe carriage is again advanced one step and the riveting and punching mechanism again thrown in. The riveting hammer now descends upon the first rivet which has been moved up on the flat portion of the anvil and completely flattens the same. It likewise descends upon the second rivet which has been inserted in the second hole but merely spreads this rivet sufficiently to draw the two edges of the pipe together. At the same time the punch has punched a fourth hole in the pipe. This cycle of operations is continued, first throwing in the punching mechanism, then disconnecting and throwing in the carriage advancing mechanism until the carriage has moved the pipe up to its full length and the pipe has been completely riveted.

While we have shown and described an embodiment of our invention, it will be understood that various modifications and changes may be made therein without departing from the spirit of our invention, as set forth in the appended claims.

Having thus described our invention, what we claim as new and desire to secure by Letters Patent, is:—

1. In a device of the character described, the combination with a riveting hammer and a punch, of a reciprocating rod, means for supporting said rod at its rear end, a head mounted on the front end of said rod around which the pipe is arranged to be placed, a carriage for advancing said pipe step by step and arranged to be moved forward by the reciprocations of said rod.

2. In a device of the character described, the combination with a riveting hammer and a punch, of a reciprocating rod, means for supporting said rod at its rear end, a head mounted on said rod around which the pipe is arranged to be placed, a pipe carriage arranged to be moved forward step by step by the reciprocations of said rod, and a support for said head adapted to be disengaged therefrom to permit the pipe to be secured on said head.

3. In a device of the character described, the combination with a riveting hammer and a punch, of a reciprocating rod, a head mounted on the end of said rod and beneath said punch and hammer, a pipe carriage adapted to be advanced step by step by the reciprocations of said rod, means for positioning and guiding said head relatively to said punch and hammer, and a support for said head arranged to be disconnected therefrom to permit the pipe to be secured around said head.

4. In a machine of the character described, the combination with a pipe punch and a riveting hammer, of a head or anvil beneath said punch and hammer and arranged to snugly fit the inside of the pipe, clamping dies for holding the pipe around said head, and a support for said head.

5. In a pipe riveting machine, the combination with a punch and a riveting hammer, of a head arranged to snugly fit the pipe mounted beneath said punch and hammer, clamping dies for holding the pipe around said head, and a support for said head arranged beneath the same and adapted to be moved into supporting position after the pipe has been adjusted on the head.

6. In a riveting machine, the combination with a punch and riveting hammer, of a head or anvil of a size to snugly fit the pipe, said anvil having on its upper side anvil spots or levels of different heights.

7. In a pipe riveting machine, the combination with a riveting hammer, of an anvil around which the pipe is adapted to be placed, said anvil having riveting spots or levels of different heights and arranged below the pipe supporting level of the anvil.

8. In a pipe riveting machine, the combination with a riveting hammer, of an anvil around which the pipe is placed, said anvil having a slot formed therein and riveting spots or levels of different heights in said slot and below the pipe supporting surface of the anvil.

9. In a pipe riveting machine, the combination with a riveting hammer, of an anvil, said anvil having a slot formed therein, said slot having its bottom inclined upwardly toward the top.

10. In a pipe riveting machine, the combination with a reciprocating riveting hammer, having a head of sufficient width to strike two or more rivets, of an anvil arranged beneath said riveting hammer around which the pipe is arranged to be placed, said anvil having riveting spots varying in height and arranged below the pipe supporting level of the head, and a support beneath said anvil removable to permit the pipe to be placed in position.

In witness whereof, we have hereunto subscribed our names in the presence of two witnesses.

CARL G. NAYLOR.
ROBERT R. ROBERTSON.

Witnesses:
O. CZEKALA,
W. PERRY HAHN.